Aug. 30, 1932.    R. J. ANSCHICKS    1,874,414
FLUID CONTROL APPARATUS
Filed Aug. 24, 1929    7 Sheets-Sheet 1

Inventor:
Rudolph J. Anschicks

Aug. 30, 1932.  R. J. ANSCHICKS  1,874,414
FLUID CONTROL APPARATUS
Filed Aug. 24, 1929  7 Sheets-Sheet 2

Witness:
William P. Kilroy

Inventor:
Rudolph J. Anschicks

Aug. 30, 1932.                R. J. ANSCHICKS                1,874,414
                            FLUID CONTROL APPARATUS
                             Filed Aug. 24, 1929            7 Sheets-Sheet 4

Aug. 30, 1932.   R. J. ANSCHICKS   1,874,414
FLUID CONTROL APPARATUS
Filed Aug. 24, 1929   7 Sheets-Sheet 5

Patented Aug. 30, 1932

1,874,414

UNITED STATES PATENT OFFICE

RUDOLPH J. ANSCHICKS, OF CHICAGO, ILLINOIS, ASSIGNOR TO PROTECTOSEAL COMPANY OF AMERICA, OF CHICAGO, ILLINOIS, A CORPORATION OF ILLINOIS

FLUID CONTROL APPARATUS

Application filed August 24, 1929. Serial No. 388,160.

My invention relates to fluid control apparatus and more particularly it relates to improved apparatus operable to control the transfer of oil and other volatile liquids from one tank to another.

The invention is especially adapted for use in loading and unloading tank cars and for this purpose comprises a cover plate or closure member operable to temporarily replace permanent dome cover of a tank car, during loading and unloading.

Volatile liquids, such for example, as ammonia, gasoline and the like, give off a considerable percentage of vapor to the surrounding air when the liquid is in a quiescent state. The percentage of vapor given off by such liquids is greatly increased by the turbulence resulting from loading or unloading the same. For example, in loading a tank car with gasoline the volume of vapor which is displaced exceeds the volume capacity of the tank car because of agitation and temperature change. This excess of volume frequently runs from 160 to 260% of the volume capacity of the tank. The financial loss resulting from permitting the vapor to escape into the surrounding atmosphere is substantial. The fire hazards resulting from the escape of inflammable vapor also makes it highly desirable that apparatus be provided which will prevent vapor loss.

The closure member which is provided as a temporary cover replacing the permanent dome cover of a tank car may be utilized either for filling or unloading the tank car by varying the details of construction.

In one of the embodiments shown the closure member is adapted for closed filling and closed venting. By closed filling is meant causing the liquid to flow from the supply tank into the receiving tank through a fluid tight conduit while the displaced air or gases are caused to flow through another fluid tight conduit either from the receiving tank directly back to the discharge tank or to some other tank adapted to receive and condense such vapors. The advantages of closed filling include the prevention of flame propagation within the tank and of the loss which otherwise would result by reason of the vapors escaping into the atmosphere.

By a slight modification of the closure member, it is adapted for open filling wherein the liquid is conveyed to the tank car through a tube or conduit which projects through and loosely fits an opening in the closure member. No separate vent opening is necessary for open filling since the displaced vapors or gases readily escape through the filling opening. No provision being made for conserving the displaced vapors, it becomes necessary to provide a fire baffle or screen for the filler opening to prevent flames generated by the accidental combustion of the escaping gases from finding their way into the interior of the tank being filled.

By a still further modification, the closure member which may be adapted for closed filling and open venting with a fire baffle or screen provided for the vent only.

In utilizing the closure member for unloading the tank car the liquid may be removed by pumping or siphoning through the device with one or more openings providing for direct venting, such openings necessarily being screened or equipped with fire baffles to prevent propagation of flame. The closure member as used for closed filling and open venting may also be used for unloading without any change whatever.

The closure member may be adapted for gravity unloading by providing screened vent openings in the closure member and opening the valve in the bottom of the car. As the oil flows through the open valve air passes through the vent openings into the tank to replace the displaced oil. Since the vent openings are screened there is no danger of propagation of fire in the tank.

The closure member may also be used for unloading by compressed air. This result is accomplished by connecting the tank car with an unloading tank by means of a closed conduit and with an air pressure pump by means of a second conduit. Operation of the pump forces air into the tank under pressure and this in turn forces the oil out through the discharge conduit.

An object generally of the invention is the provision of improved apparatus operable for both closed and open filling of a tank car or the like.

Still another particular object of the invention is the provision of a closure member operable to temporarily displace the permanent dome cover of a tank car or the like in order to facilitate the open filling or discharge of the tank car.

Another particular object of the invention is the provision of improved means operable to prevent explosion and propagation of fire during the loading or unloading of volatile liquids from a tank car or the like.

Still another object of the invention is the provision of improved apparatus operable to replace the permanent cover of a tank opening during closed filling or discharge of the tank.

A further object of the invention is the provision of apparatus operable to replace the permanent closure member of a tank, such apparatus being utilized to discharge the tank by means of compressed air.

A still further object of the invention is the provision of improved apparatus operable for open filling of a tank without danger of fire propagation.

Still another object of the invention is the provision of a novel method for the interchange of liquids or fluids between two closed tanks or reservoirs.

A still further object of the invention is the provision of apparatus adapted to connect a plurality of tanks and thereby permitting the cyclic interchange liquids and gases from one tank to another.

Another object of the invention is the provision of a novel method for the transfer of volatile liquids from one tank to another without loss of vapor or danger of fire, the liquid flowing into the receiving tank operating to displace a relatively large volume of vapor laden air contained in the receiving tank, such air flowing to the discharge tank to replace the outflowing liquid and having its volume reduced in the discharge tank by condensation and conservation of its vapor load.

A more specific object of the invention is the provision of improved means for fastening apparatus of the kind described to the dome of the tank car.

The permanent dome cover of certain classes of tank cars is fastened to the car by means of a chain. The chain has one end fastened to the under surface of the permanent dome cover by means of a staple or the like with the other end of the chain similarly fastened to the interior surface of the dome. When the dome cover thus fastened is removed the chain is positioned partly within the tank and partly without the tank. This position of the chain requires special construction of the closure member in order that the closure member closely fits the opening in the dome and, another particular object of the invention is the provision of elastic means operable to yield and pack about the chain so as to prevent the escape of vapor from the tank car at the point where the chain emerges from the tank.

The invention has among its other objects the production of fluid control apparatus of the kind described, which is relatively simple in construction, convenient, durable, reliable, and satisfactory for use wherever found applicable.

Many other objects and advantages of the construction herein shown and described will be obvious to those skilled in the art from the disclosure herein given.

To this end, my invention consists in the novel construction, arrangement, and combination of parts herein shown and described, and more particularly pointed out in the claims.

In the drawings, wherein like reference characters indicate like or corresponding parts.

Figure 1:
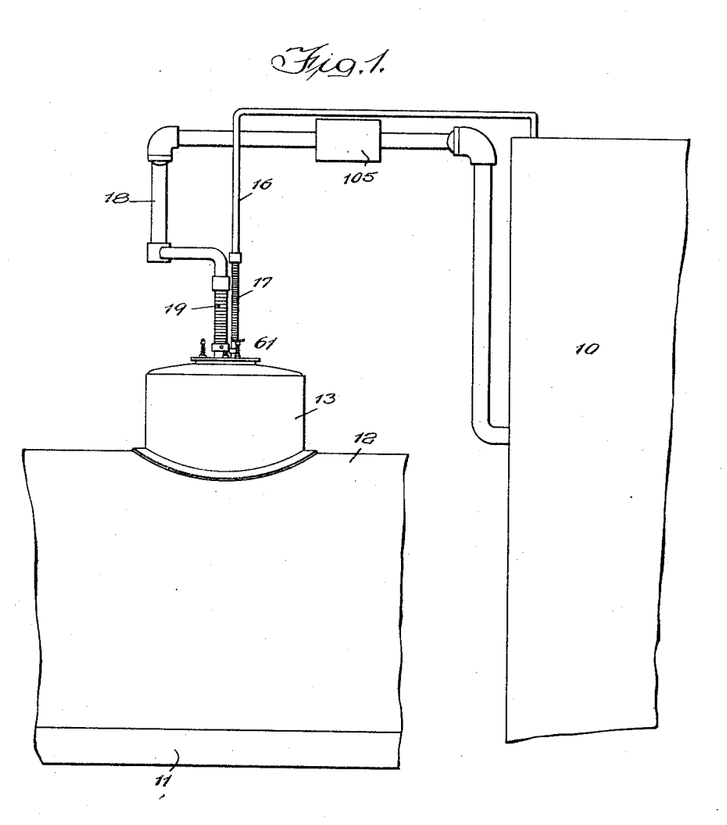
Fig. 1 is a fragmentary elevational view of a tank car including a dome showing diagrammatically the device of my invention as operable to connect the car with a storage tank for the purpose of closed filling and venting of the tank car.

Referring now more particularly to the drawings, a storage tank, generally designated by the numeral 10, is shown in Fig. 1 as connected with a tank car 12 by separable closed filling and venting systems, hereinafter more particularly described. The tank 12 is mounted upon a car body 11. The device of my invention comprises a closure member, shown as mounted upon a dome 13 of the tank 12 and temporarily replaces a permanent dome cover, not shown. The dome 13 is provided with an inlet opening 14 having an annular member 20 forming a border for the opening.

Figure 2:
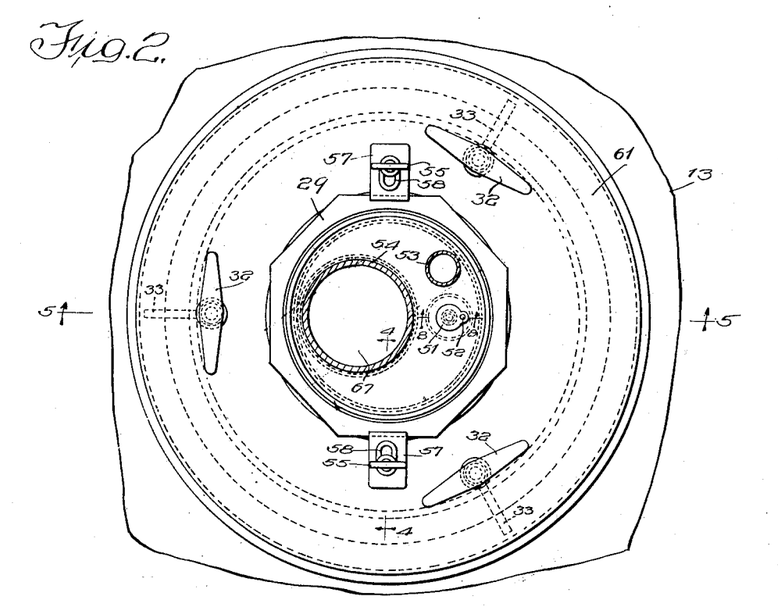
Fig. 2 is a plan and partial sectional view of one embodiment of my device adapted for open filling.
Figure 5:
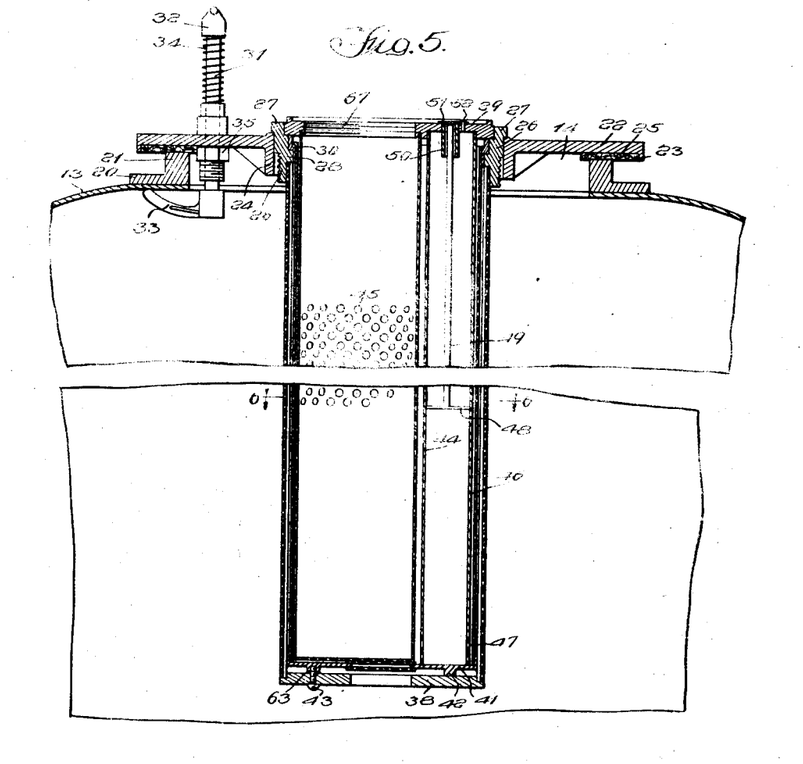
Fig. 5 is a section along the line 5—5 of Fig. 2.
Figure 6:
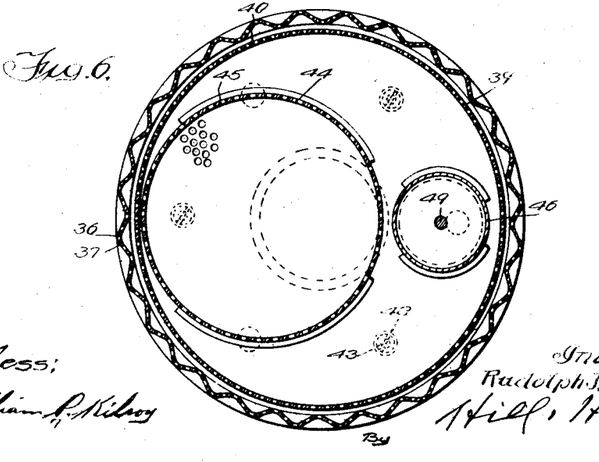
Fig. 6 is a section along the line 6—6 of Fig. 5, drawn to a larger scale.

The embodiment of the invention shown in Figs. 2 and 5 illustrates one form of open filling and venting which may also be used for closed filling and venting, if desired. The annular member 20 has an upturned flange 21, upon which a closure member hereinafter designated as an adapter 61 is mounted. The adapter 61 comprises an annular plate 22 having its outer border bounded by a downwardly turned flange 23. The plate 22 is centrally apertured and has its interior periphery bounded by a downwardly turned flange 24. An annular pad 25 of felt or similar material is positioned on the under face of the plate 22 in close proximity to the flange 23. The pad 25 provides a fluid tight connection between the plate 22 and the annular member 20.

A ring member 27 is positioned adjacent to and is supported by the flange 24 of the plate 22. The ring member 27 has its inner face offset inwardly and downwardly to provide a shoulder support 62 for a cap plate 29. A second projection on the inner periphery of the ring member 27 provides a shoulder support 28 for a filler ring 30.

The adapter 61 is fixedly mounted on the dome 13 by a plurality of punch lugs 31, each having a handle 32 by means of which the lugs are operated. A spring 34 holds the lugs 31 in the position shown with a lower hook portion 33 engaging the inner face of the dome 13. A nut 35, mounted on the lower portion of the lug 31, serves as a stop to limit the upward movement of the lug induced by the resilience of the spring 34.

The cap plate 29 provides a mounting for a device operable as a fire baffle. The fire baffle includes an outer generally cylindrical foraminous tube 36 having its side walls corrugated. The tube 36 is provided with a plurality of flame-proof apertures 37. An inner foraminous tube 39 positioned within the tube 36, is provided with a plurality of relatively small apertures 40. The upper end of the tube 36 fits the inner periphery of the ring member 27. A plate 38, positioned in the bottom of the tube 36, is fastened to a plate 41 forming the bottom of the tube 39. A plurality of lugs 42, projecting downwardly from the plate 41, each have an aperture 63 threaded to receive a screw bolt 43 carrying the plate 38. The tube 39 has its upper end turned outwardly to form a rim 64. The rim 64 rests upon a shelf 65 and thereby carries the weight of the fire baffle device.

A filling tube 44 of relatively thick metal is mounted within and positioned eccentrically to the tubes 36 and 39. The upper end of the tube 44 is inserted in a groove 66 formed in the cap plate 29. A plurality of apertures 45 permit the flow of liquid through the walls of the tube 44.

Figure 9:
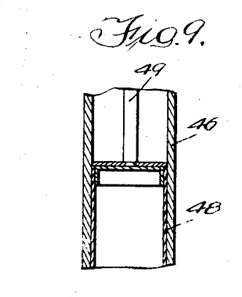
Fig. 9 is a large scale detail view of float apparatus forming a portion of the device.
Figure 10:
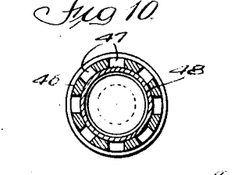
Fig. 10 is a large scale section along the line 10—10 of Fig. 8.

Float means is provided within the foraminous tube 39 to determine the height of the oil when the tank is substantially filled. The float means includes a tube 46 having a cylindrical piston 48 reciprocally movable in the tube. The upper portion of the tube 46 is closed while the lower portion has a plurality of apertures 47 which permits liquid to enter the tube below the piston. The buoyancy of the liquid tends to lift the piston 48 within the tube 46 as the liquid level rises and permits the piston to fall as the level of the liquid recedes. A stem 49 projecting upwardly from the piston 48, cooperates with a stem guide 50 suitably mounted in and projecting through the cap plate 29. A plate 51 pivotally mounted on a vertical pin 52, normally closes the stem guide 50 and provides a stop preventing the liquid from elevating the piston 48 when the plate 51 is closed. As the level of the liquid approaches its maximum allowable upper limit as determined by governmental regulations, the operative rotates the lid 51 to uncover the end of the stem 49 and thereby permits the piston 48 to rise with the liquid. The stem 49 may be provided with suitable graduations (not shown) to indicate the exact elevation of the liquid as it approaches its allowable upper limit.

The cap plate 29 is fastened on the plate 22 by clips 57 which are clamped in position by a pair of oppositely positioned bolts 56. The bolts 56 are fixedly mounted on the plates 22 and project upwardly through a slot 58 in the clip 57. Wing nuts 55 threaded on the upper end of the bolts 56 hold the clips 57 in the position shown in Fig. 4 wherein the inner end of the clip cooperates with the upper end of the ring member 27. The ring member 27 is fastened to the cap plate 29 by a plurality of screw bolts 59, the bolts being counter-sunk in the ring member 27 and in the outer peripheral edge of the cap plate so as to clear the inwardly projecting end of the clip 57.

Figure 4:
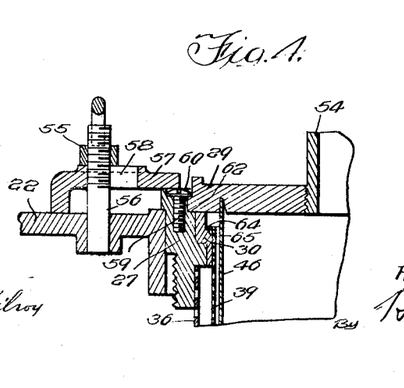
Fig. 4 is a section along the line 4—4 of Fig. 2 drawn to a larger scale.

For open filling a conduit or tube not shown may be loosely inserted in the threaded opening 67 in the cap plate 29. The opening 67 is then self-venting with the tubes 36 and 39 forming a fire baffle preventing propagation of flames in the tank in the event of accidental ignition of exterior vapors or oil. Should it be desired to use this embodiment for closed filling a nipple not shown may be threaded into the opening 67 and the flexible tube 19 fastened to the open end of the nipple. A nipple 53 is also threaded into the cap plate 29 to provide a connection for a vent pipe 17 when the device is to be used for closed filling. The vent pipe 17 is preferably flexible to avoid the necessity of spotting or exactly locating the tank car 12 with reference to the tank 10. The conduit 19 is also made flexible for the same reason. The pipe 17 is connected with a rigid pipe 16 leading to the tank 10. A discharge nipple 54 is shown in Fig. 4 as mounted in the opening 67 and threaded into engagement with the cap plate 29. For closed filling the flexible tube 19 is connected with the nipple 54 while in open filling the tube 19 may be loosely inserted in the opening 67. The tube 19 is connected with the tank 10 by a pipe 18 permitting the transfer of oil from the tank 10 into the tank 12.

Figure 3:
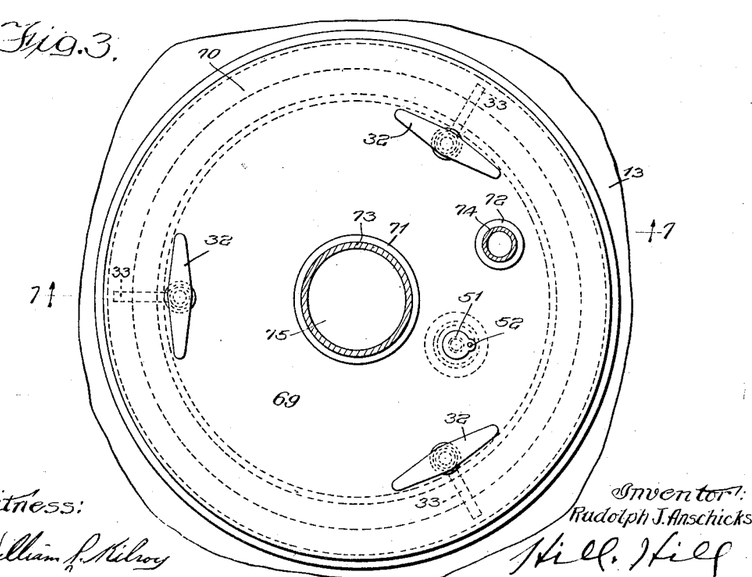
Fig. 3 is a plan and partial sectional view of the device shown in Fig. 1 drawn to a larger scale.
Figure 7:
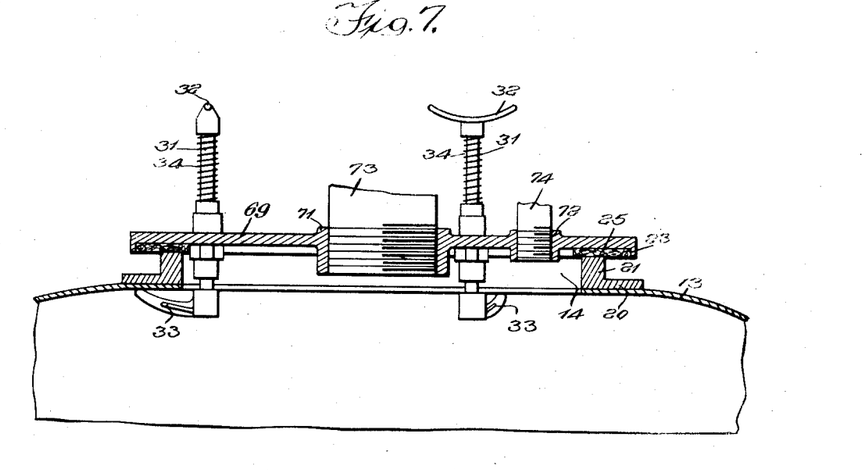
Fig. 7 is a section along the line 7—7 of Fig. 3.
Figure 8:
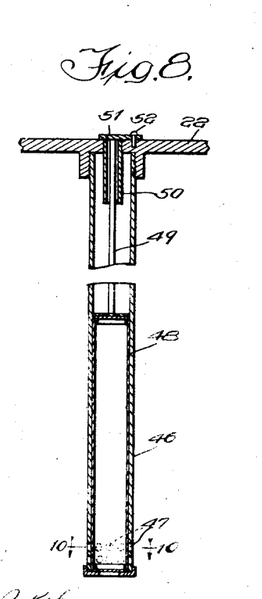
Fig. 8 is a section along the line 8—8 of Fig. 2.

Figs. 3 and 7 illustrate an alternative embodiment of the invention wherein the closure member or adapter 69 is used for closed filling and closed venting. The adapter 69 comprises a circular plate 70 having an inner flange 71 bounding an inlet opening 75. A pipe nipple 73 is threaded into the flange 71 and a vent flange 72 provides a threaded connection for a vent nipple 74. The plate 70 has an outer downwardly turned flange 23 surrounding a felt pad 25. The pad 25 provides a fluid tight joint between the flange 21 and the plate 70. A plurality of punch lugs 31 hold the plate 70 in position on the flange 21.

The nipple 73 provides a fluid tight connection between the adapter 69 and the vent nipple 74 provides a similar connection between the plate 70 and the flexible tube 17.

A pump 105, shown diagrammatically in Fig. 1 may be utilized to transfer oil from tank 10 to the tank car 12 or in some cases the oil may flow by gravity or be siphoned. As the oil is discharged into the tank 12 the vapor contents of the tank are displaced and flow through the flexible pipe 17 and the pipe 16 back into storage tank 10. The tank 10 thus provides a condenser to conserve the displaced vapor contents of the tank car.

Figure 11:
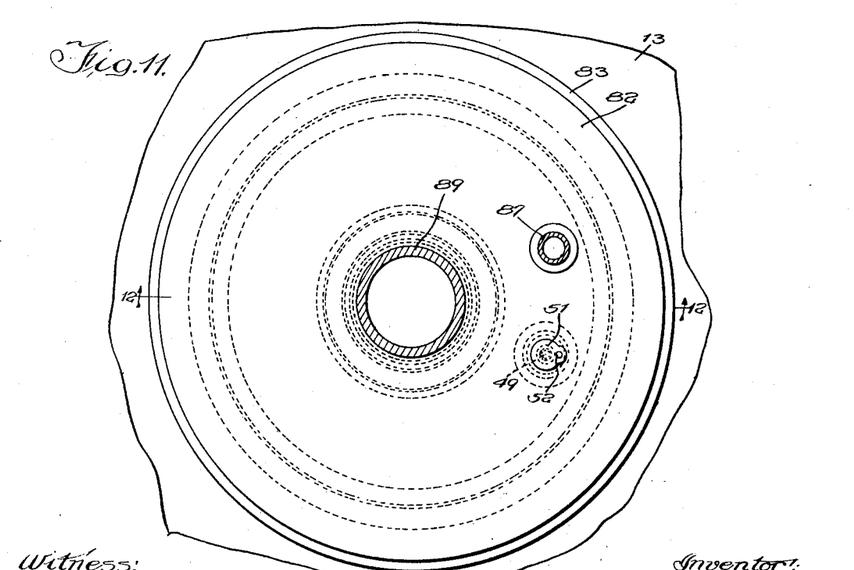
Fig. 11 is a plan view of the invention so modified as to be adapted for either closed filling and closed venting, or for open filling and venting.
Figure 12:
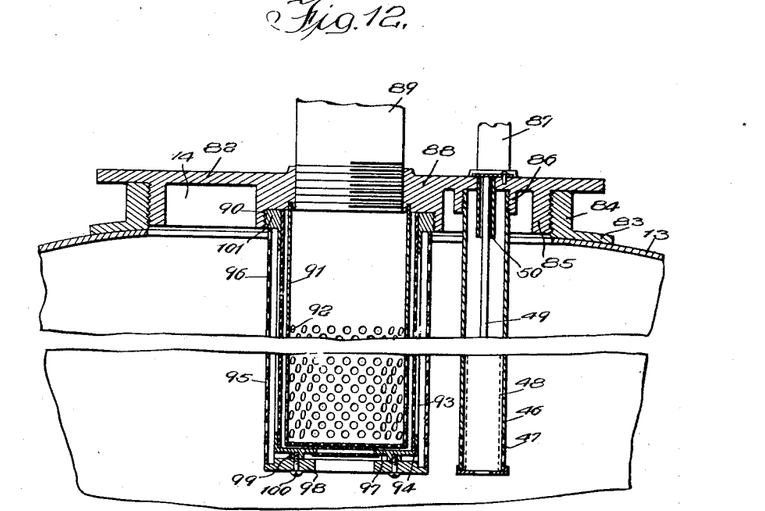
Fig. 12 is a section along the line 12—12 of Fig. 11.

In Figs. 11 and 12 is shown still another embodiment of the invention wherein a fire baffle is provided in connection with a closed filling and closed venting device or adapter 81 to prevent any possibility of ignition of the vapor contents of the tank opening disconnecting the flexible pipe 17 and 19.

The adapter 81 comprises a circular plate 82 having a downwardly projecting flange 85. The inlet opening 14 within the dome 13 is bounded by an annular member 83 having an upwardly turned flange 84. The flanges 84 and 85 have threaded engagement thereby forming a fluid tight connection between the plate 82 and the member 83.

A discharge nipple 89 is centrally positioned in the plate 82 and a vent nipple 87 has a threaded connection with the plate. The nipples 87 and 89 and the flexible tubes 17 and 19 provide for closed filling and venting between the tank car and the storage tank. Upon disconnecting the tubes 17 and 19 there is a possibility of accidental flame propagation in the interior of the tank and for this purpose a baffle is provided similar to the baffle shown in section in Fig. 5. The baffle comprises an inner foraminous tube 91 having a plurality of flame proof apertures 92. The baffle also comprises a middle foraminous tube 93 having a plurality of apertures 94 and an outer foraminous tube 95 having apertures 96. The tube 93 has a bottom plate 97 from which is suspended a plate 98. The plate 98 forms the bottom of the tube 95. A plurality of lugs 99, on the bottom of the plate 97, each have a threaded aperture for the reception of screw bolts 100 which carry the plate 98. The upper end of the tube 93 is fastened to a ring 101. The ring 101 has a threaded connection with a downwardly projecting ring 90 which is integrally formed on a flange 99 into which the nipple 89 is threaded.

Figure 13:
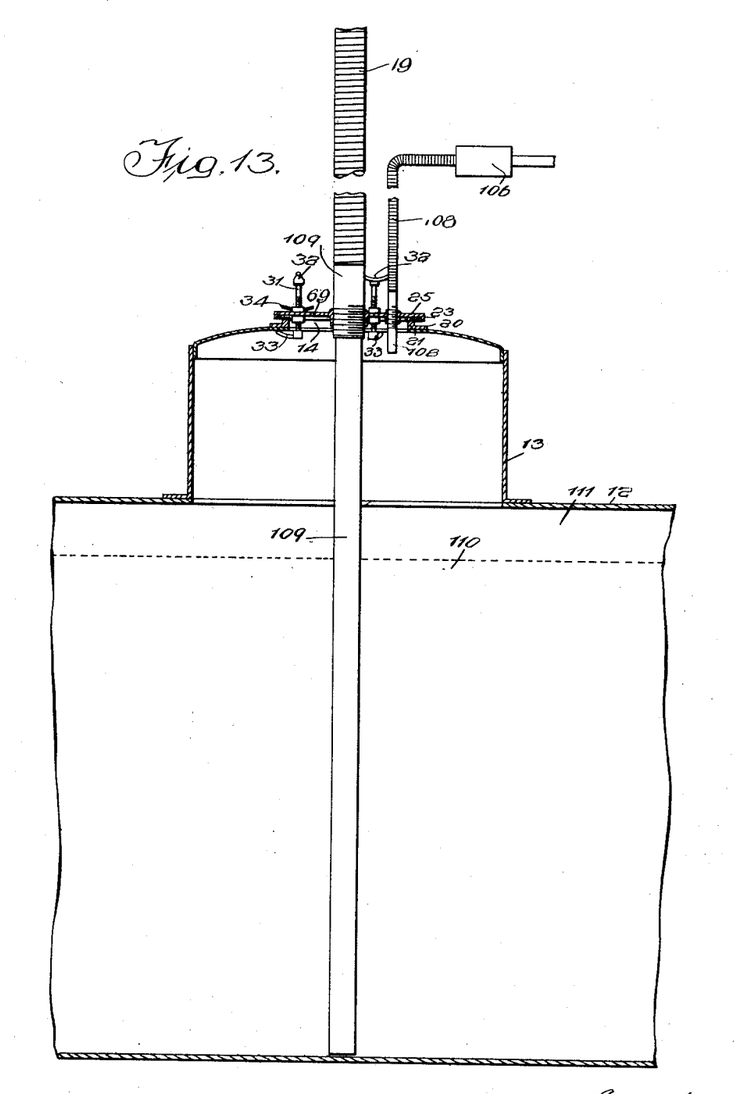
Fig. 13 is a sectional view of still another embodiment of the invention.

Still another embodiment of the invention is shown in Fig. 13 wherein the adapter is utilized as an unloading device by forcing air under pressure into the tank 12. For this purpose I have provided a flexible air inlet pipe 108 corresponding to the vent pipe of the embodiments already described. An air pump 106 is operatively connected with the pipe 108 to force air into the top of the tank. The adapter is similar to the device already shown and described in connection with Figs. 11 and 12. A discharge pipe 109 is threaded through the plate 70 with the lower end of the pipe spacing away from the bottom of the tank a slight distance. The upper end of the pipe 109 projects through the plate 70 sufficiently to permit the flexible tube 19 to be connected therewith. In operation the air is forced under pressure into the upper portion 111 of the tank through the pipe 109, the pressure being sufficient to force the oil 110 out through the lower end of the pipe 109 and thence upwardly through the flexible pipe 19 and the pipe 18 into the receiving tank 10.

The punch lugs 31, as used with the embodiments previously described, are modified to resist the pressure within the tank. This is accomplished by threading a wing nut 77 on to the shank 78 of the lug 31 and dispensing with the spring 34. The nut 77 is threaded downwardly into close contact with the plate 70 thereby preventing the plate from yielding under the pressure of the air within the tank, and maintaining a sealed connection between the closure member and the tank. By placing the lower end of the pipe 109 adjacent the bottom of the tank 12, substantially the entire contents of the tank will be discharged by reason of the air pressure.

Figures 14, 15, 17:
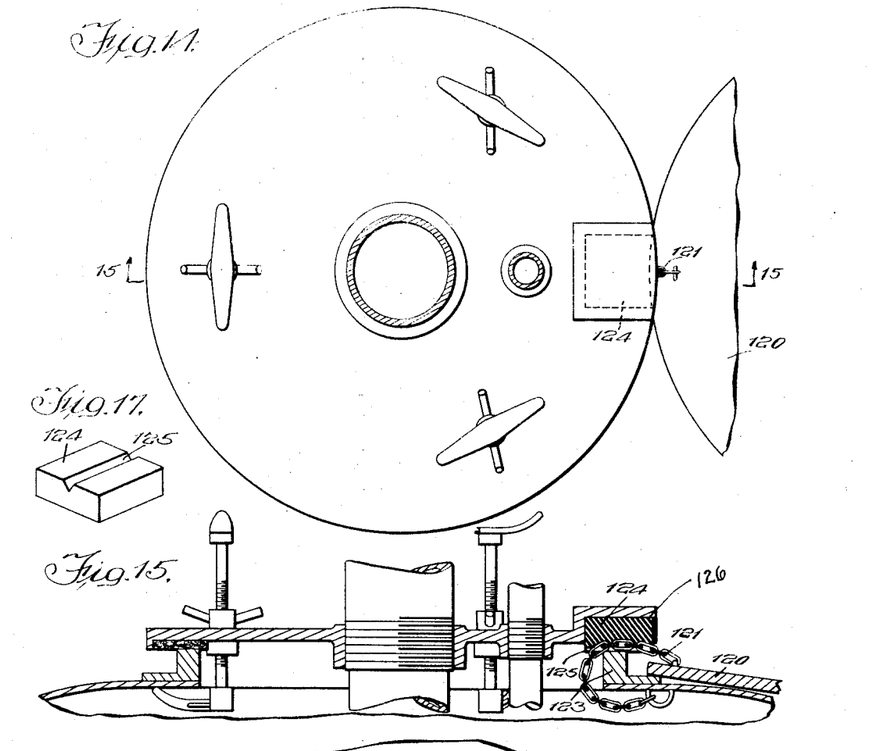
Fig. 14 is a plan view of the invention, modified to permit the closure member to fit around a chain positioned partly within the tank and partly outside of the tank.
Fig. 15 is a section along the line 15—15 of Fig. 14.
Fig. 17 is a perspective view of a detail forming a portion of the invention.
Figure 16:
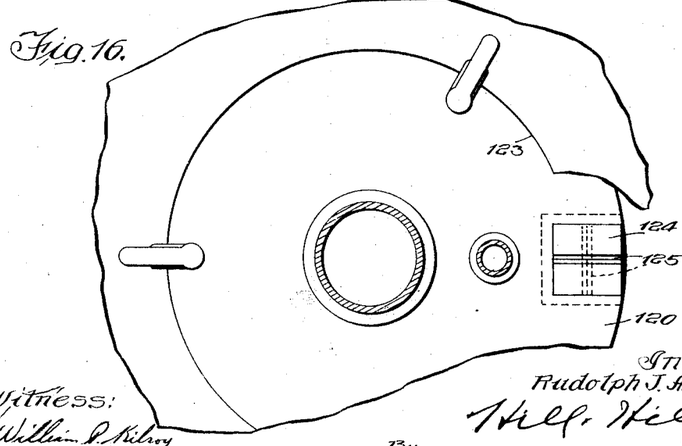
Fig. 16 is a view of the under side of the device shown in Fig. 14.

In Figs. 14 and 16 I have shown my adapter as modified to provide a fluid tight closure member for use in connection with a tank car having a permanent dome cover 120 secured to the inside of the dome by means of a chain 121. When the dome cover 120 is turnd back the chain 121 is in contact with the flange 123 and requires a special construction of the adapter to make the connection fluid tight at the point where the chain emerges from the tank. For this purpose I provide a square pocket 126 in the outer periphery of the adapter suitable to contain a relatively thick block 124 of sponge rubber or the like. The block 124 is shown in perspective in Fig. 17. The block 124 is preferably square, and the block has a groove 125 extending across one face. In the event the adapter is to be used with a dome having a cover thus fastened by a chain 121, the block will be positioned with the groove 125 underneath and extending radially to the dome with the chain in the groove. The depth of the groove 125 is less than the cross sectional dimension of the chain 121. As a result, when the adapter is in position the spongy block 124 closes about the links forming the chain 121 and seals the pocket. In using the adapter as a closure member for a dome without such a chain the block 124 will be turned over with the groove 125 perpendicular to the radial line of the dome, as shown in dotted lines in Fig. 16, thereby preventing the groove 125 from forming an outlet through the closure member.

The tanks 10 and 12, as shown in Fig. 1, with their connecting pipes and pumps, are more or less diagrammatic and illustrate the general lay-out both for the opening and closing process of filling. The tank 10 may be a supply tank connected with the car tank 12 for filling the latter, or the process may be reversed, the tank 10 being a receiving tank into which the tank car 12 is unloaded. The oil pump 105 is operable for pumping oil from the tank 10 into the tank 12, or for unloading the tank 12 into the tank 10 in all of the embodiments shown and described.

Thus, it will be seen that I have provided improved apparatus operable for loading and unloading tank cars by either closed or open filling and have also provided apparatus forming a closed cycle providing for an improved method of interchange of volatile liquids and vapor-laden air between a system of tanks without loss of vapor, or danger of fire propagation, such apparatus being operable to replace a permanent cover for a tank opening.

Having thus described my invention, it is obvious that various immaterial modifications may be made in the same without departing from the spirit of my invention; hence, I do not wish to be understood as limiting myself to the exact form, construction, arrangement and combination of parts herein described and shown, or uses mentioned.

What I claim as new and desire to secure by Letters Patent is:

1. The combination with a tank having a filling opening and a permanent cover for said opening of a chain fastened to the under side of the cover and to the inside wall of the tank said chain being of a length permitting the cover to be moved to clear said opening, a temporary closure member operable to replace said cover and seal said opening, said closure member comprising a plate having a recess on its under side and a block of spongy material positioned in and filling said recess, said chain being embedded in said block when the closure member is in position.

2. The combination with a tank having a filling opening and a permanent cover for said opening of a chain fastened to the under side of the cover and to the inside wall of the tank, said chain being of a length permitting the cover to be moved to clear said opening, a temporary closure member operable to replace said cover and to seal said opening, said closure member comprising a plate having a recess on its under side and a block of spongy material positioned in and filling said recess, said block having a shallow groove on its exposed face positioned to receive a portion of said chain.

3. The combination with a tank having a filling opening and a permanent cover for said opening of a chain fastened to the under side of the cover and to the inside wall of the tank, said chain being of a length permitting the cover to be moved to clear said opening, a temporary closure member operable to replace said cover and to seal said opening, said closure member comprising a plate having a recess on its under side and a block of spongy material positioned in and filling said recess, said block having a shallow groove on its exposed face so positioned as to contain a portion of said chain, said block being square in cross section and operable for interchangeably mounting in the recess with the groove extending in either direction.

In witness whereof, I hereunto subscribe my name this 10th day of August, A. D. 1929.

RUDOLPH J. ANSCHICKS.